United States Patent [19]

Goeke et al.

[11] Patent Number: 4,471,521
[45] Date of Patent: Sep. 18, 1984

[54] ROTARY HEAD FOR MACHINING AND SIMULTANEOUSLY POLISHING THE PERIPHERAL SURFACE OF SHAFTS OR THE LIKE

[75] Inventors: Alfons Goeke, Solingen; Günter Gerhardt, Wuppertal-Vohwinkel; Horst Lorenz, Solingen, all of Fed. Rep. of Germany

[73] Assignee: Kieserling & Albrecht, Solingen, Fed. Rep. of Germany

[21] Appl. No.: 249,337

[22] Filed: Mar. 31, 1981

[30] Foreign Application Priority Data

Apr. 5, 1980 [DE] Fed. Rep. of Germany ....... 3013415

[51] Int. Cl.³ .............................................. B23B 5/12
[52] U.S. Cl. ....................................... 29/566; 29/90.5; 82/20
[58] Field of Search ...................... 29/566, 27 B, 90 R, 29/90.5; 279/113; 82/20

[56] References Cited

U.S. PATENT DOCUMENTS 736,799  8/1903  Tondel ..................................... 82/20
1,713,803  5/1929  Whiton ................................. 279/113

FOREIGN PATENT DOCUMENTS 2607901  9/1977  Fed. Rep. of Germany .......... 82/20
1216704  4/1960  France ..................................... 82/20

Primary Examiner—Z. R. Bilinsky
Attorney, Agent, or Firm—Michael J. Striker

[57] ABSTRACT

A head rotatable about an axis for machining and simultaneously polishing the peripheral surfaces of shafts or the like, comprises a support plate provided with a central opening through which a shaft to be machined and polishing may extend. A plurality of tool supports are mounted in a star-like manner on the support plate adjustable in radial direction toward a shaft extending through the central opening. The tool supports alternatingly carry at inner ends knives or polishing rolls. A central adjustment device is provided for simultaneously adjusting of the tools carried by the tool supports through equal distances in radial direction toward the workpiece. The central adjustment is carried out by a plurality of angular drives, each including a bevel gear for each tool support and at least one gear ring with which the bevel gears mesh. It is also possible to adjust all tool supports carrying the knives independent from all tool supports carrying the polishing rolls in which case two gear rings are provided which are turnably mounted on the support plate concentric with the axis of the head.

8 Claims, 2 Drawing Figures

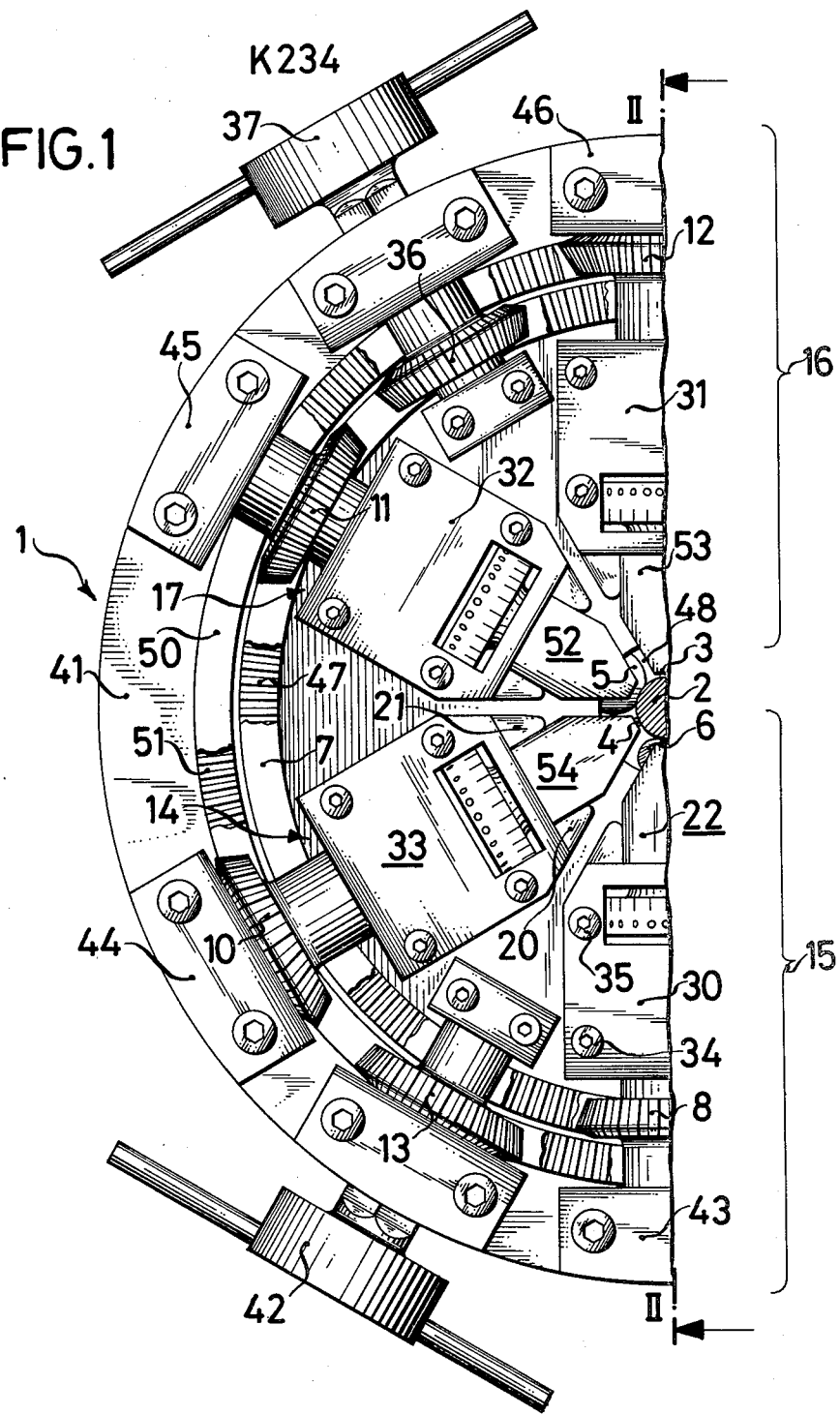

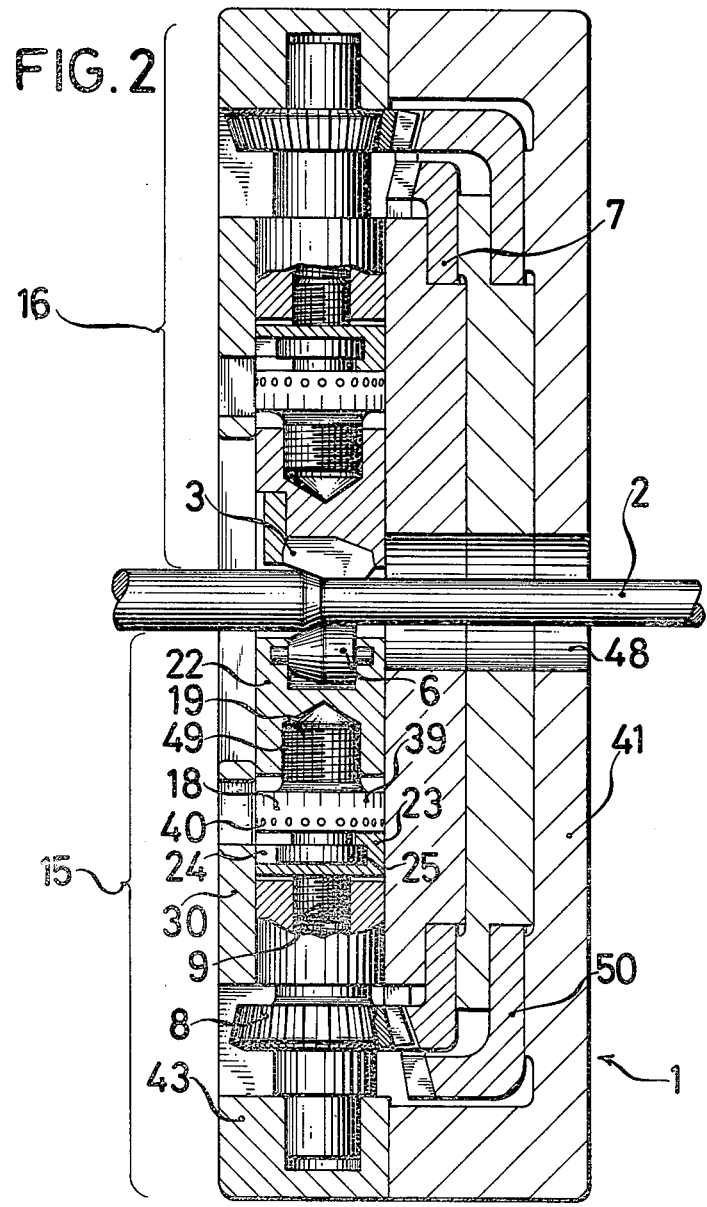

ROTARY HEAD FOR MACHINING AND SIMULTANEOUSLY POLISHING THE PERIPHERAL SURFACE OF SHAFTS OR THE LIKE

BACKGROUND OF THE INVENTION

The present invention relates to a rotary head for machining and simultaneously polishing the peripheral surface of shafts or the like in which a plurality of knives are circumferentially arranged in a plane substantially normal to the workpiece to be operated on in which about the same place a plurality of polishing rolls are provided and in which the roll and the knives are arranged so that they may be moved in radial direction toward the workpiece.

Such a rotary head for machining and simultaneously polishing the peripheral surfaces of shafts or the like is known from the British patent No. 1,128,210 in which knives and polishing rolls are arranged in a rotary head in a plane substantially normal to the axis of the workpiece to be operated on. This known construction provides means for moving each of the polishing rolls and the cutting knives individually in radial direction toward the workpiece. In this known construction, the adjustment of the tool, carried by the head for machining shafts of different diameters is rather cumbersome since the proper distance of each of the knives and each of the rolls from the surface of the workpiece has to be individually adjusted and in addition the concentricity of workpiece and head has to be obtained.

SUMMARY OF THE INVENTION

It is an object of the present invention to provide a rotary head for machining and simultaneously polishing the peripheral of shafts or the like which avoids the above mentioned disadvantages of such a head known in the art.

It is a further object of the present invention to provide a rotary head of the aforementioned kind which is composed of relatively few and simple parts and in which the adjustment of the knives and polishing rolls for any diameter of the workpiece can be greatly simplified.

With these and other objects in view, which will become apparent as the description proceeds, the rotary head according to the present invention for machining and simultaneously polishing the peripheral surfaces of shafts or the like mainly comprises support means extending substantially in a plane normal to the axis of a shaft to be machined and polished, a first plurality of circumferentially displace tool support means mounted on said support means for movement in radial direction with respect to the shaft, a cutting knife on the inner end of each of the first plurality of the tool support means for machining the peripheral surface of a shaft extending centrally between the cutting knives, a second plurality of tool support means circumferentially spaced from each other and the first plurality mounted on the support means for movement in radial direction with respect to the shaft and each carrying a polishing roll on the inner end thereof for polishing the peripheral surface of the shaft, and means for radially and simultaneously adjusting all of the first plurality of tool support means and for radially and simultaneously adjusting all of the second plurality of said tool support means for simplifying the adjustment of the rotary head for machining and polishing shafts of different diameters.

While central adjusting means in certain devices, as for instance chucks for lathes or the like are known in the art, in such devices equal elements have to be moved in radial direction. In accordance with the present invention, however, different elements have to be moved in radial direction, that is polishing rolls and cutting knives which are subjected during operation to different vibrations and also subjected to different forces.

Preferably, the aforementioned adjusting means comprise first adjusting means for simultaneously adjusting all of the first plurality of support means respectively carrying the cutting knives, and second adjusting means for simultaneously adjusting all of the second plurality of tool support means carrying the polishing rolls independent of the adjustment of the first plurality of tool support means. This construction is preferred since by this construction it is possible to take care of the different wear of the cutting knives and the polishing roll during the operation. The adjusting means preferably comprise a pair of gear rings mounted on the support means turnable about the axis of the head and a plurality of pinions respectively connected to the first and second plurality of tool support means in which the pinions connected to the first plurality of tool means mesh with one of the gear rings and the pinions connected to the second plurality of tool means mesh with the other of the gear rings.

Preferably the gear rings and the pinions meshing therewith are formed as bevel gears.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 illustrates half of a rotary head according to the present invention in an end view; and FIG. 2 is a cross-section taken along the line II—II of FIG. 1.

DESCRIPTION OF A PREFERRED EMBODIMENT

The rotary head 1 according to the present invention serves for machining and simultaneously polishing the peripheral surfaces of rods or shafts 2. The head 1 comprises support means in form of a circular base plate 41 provided with a central opening 48 through which a shaft 2 to be operated on is adapted to extend with considerable clearance. A first plurality of tool support means, of which only two, that is the tool support means 14 and 16 are shown in FIG. 1, and a second plurality of tool support means, of which only the support means 15 and 17 are shown in FIG. 1, are mounted on the base plate 41, and the first plurality of tool support means carry, respectively, at their inner ends cutting knives 3 or 4, whereas the second plurality of tool support means carry, respectively, at the inner ends polishing roll 5 or 6. Each of the tool support means are laterally guided by side plates 20 and 21 and at their front faces thereof the tool support means are guided by cover plates 30–33, respectively connected to the base plate by screws 34 and 35. The head includes further a pair of concentric gear rings 7 and 50 respectively provided with gear teeth 47 and 51 and a plurality of pinions, one for each of the tool support means of which only the pinions 8, 10, 11 and 12 are shown in the drawing, respectively meshing with the gear ring 7 or the gear ring 50. The head includes further two additional pinions 13 and 36 turnably mounted on the base plate 41 and respectively meshing with the gear rings 7 and 50 for respectively turning the two gear rings about the axes thereof. Each of the additional pinions 13 and 36 are respectively turnable by keyes 37 and 42 detachably inserted thereinto. The shaft 2 is centralized with respect to the head 1 in a known manner by non-illustrated rolls or in a clamping carriage and axially moved by a corresponding known drive likewise not illustrated in the drawing.

The tool support means 14–17 are all constructed in the same manner with the exception of the means for mounting a knife or a roll at the inner end thereof and the length of the pinions connected thereto which have respectively to mesh with the gear ring 7 or 50. The construction of the tool support means will now be described in connection with the tool support means 15. As shown in FIG. 2 the tool support means 15 comprises an inner or tool holder part 22 carrying in this case a polishing roll 6 rotatable about its axis. The tool holder part 22 is provided with a central blind bore extending from the outer end face thereof normal to the axis of the head into the part 22 and provided with an inner self-locking screw thread 19 meshing with the outer screw thread 49 provided on the peripheral surface of an individual adjusting screw 18. A scale 39 is provided at the head of the adjusting screw 18 on which the position of the individual tool relative to the other tools may be read. The adjusting screw 18 can be turned by means of a pin inserted in the bores 40 provided circumferentially spaced from each other in the head of the adjusting screw 18. The adjusting screw is provided at its outer end with a T-shaped extension 25 engaging in a corresponding groove 24 of a head 23 of rectangular cross-section and fixedly connected to a screw spindle 9 meshing with an inner self-locking screw thread provided in an outer portion of the respective tool holder means integrally connected with a respective pinion for turning therewith. The inner or tool holder part 22 of each tool support means is of rectangular cross-section and guided for movement only in axial direction by the previously mentioned side plates 20 and 21. The pinion 8 is turnably mounted at its outer end in a bearing block 43 fixed in any convenient manner, for instance by screws, the base plate 41. The bearing block 43 takes up the axial forces emanating from the tool during engagement thereof with the workpiece.

All the pinions are cone-shaped and mesh with a corresponding cone-shape gearing of the gear rings 7 and 50 so as to form therewith angular drives for the tool support means. The gear ring 50 constructed as bevel gear together with the pinions cooperating with the first plurality of tool holder means, such as the pinion 10 and 12 shown in FIG. 1 and the additional pinion 13 meshing with the gear ring 50 constitute therefore first adjusting means for simultaneously adjusting all of the first plurality of tool support means carrying at the inner ends thereof the cutting knives 3 or 4, for simultaneously adjusting the position of these cutting knives through equal distances, whereas the gear ring 7 together with the pinions cooperating therewith and connected to the second plurality of tool holder means constitute with the additional pinion 36 second adjusting means for simultaneously adjusting all of the second plurality of tool support means carrying at the inner ends thereof the polishing rolls 5 or 6 for simultaneously adjusting the position of these polishing rolls through equal distances. The various tool support means are arranged together with the pinions connected thereto in a star-shaped manner about the central opening 48 in the base plate 41, preferably, angularly displaced from each other through equal angles and preferably with the tool support means carrying at their inner ends the cutting knives alternatingly arranged with the tool support means carrying at their inner ends the polishing rolls. The various elements of each tool support means are arranged along a straight line extending in radial direction toward the central opening 48.

The advantages of the head according to the present invention are extremely simple adjustment of the various tools carried thereby, as well as the considerable rigidity thereof. The rigidity of the head results from the fact that the reaction forces extending radial from the workpiece are transmitted in straight lines, that is, without imparting bending forces to any of the construction elements, directly onto the base plate 41, respectively to the bearing block 43–46 connected thereto. The tool support means may individually be removed from the head 1 by unscrewing the screws 34, 35, by means of which the cover plates 30–33 are connected to the base plate 41 to permit thereby a quick exchange of the respective tool support means and the tools carried thereby. It is also possible to provide the second plurality of tool support means instead with polishing rolls likewise with cutting knives serving for instance for premachining the peripheral surface of a shaft, whereby the cutting knives for premachining of the peripheral surface of the shaft have to be properly adjusted in radial direction with respect to the other cutting knives serving for finish machining the peripheral shaft surface.

It will be understood that each of the elements described above, or two or more together, may also find a useful application in other types of rotary heads for machining and simultaneously polishing the peripheral surfaces of shafts or the like differing from the types described above.

While the invention has been illustrated and described as embodied in a rotary head for machining and simultaneously polishing the peripheral surfaces of shafts provided with a plurality of cutting knives for machining and a plurality of polishing rolls for polishing the peripheral surface of a shaft and in which all of the cutting knives and all of the polishing rolls may be simultaneously adjusted through equal distances in radial direction with respect to the workpiece, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A head rotatable about an axis for machining and simultaneously polishing the peripheral surfaces of shafts, comprising support means extending substantially in a plane normal to the axis of a shaft to be machined and polished; a first plurality of circumferentially displaced tool support means mounted on the support means for movement in radial direction with respect to the shaft, each of said first plurality of support means having an inner end; a cutting knife on said inner end of each of said first plurality of said tool support means for machining the peripheral surface of the shaft extending centrally between each cutting knife; a second plurality of tool support means circumferentially spaced from each other and mounted on said support means for movement in radial direction with respect to the shaft, each of said second plurality of tool support means having an inner end; a polishing roll mounted on the inner end of each of said second plurality of tool support means for polishing the peripheral surface of the shaft, each tool support means of the first plurality and second plurality of tool support means being developed in two parts and including said inner end part extending in radial direction and carrying said knife or polishing roll and an outer port extending in radial direction; a plurality of individual adjusting means for individual radially adjusting each of said inner end part with respect to its outer part first and second joint adjusting means each arranged for radially and simultaneously adjusting all of said second plurality of support means, respectively for simplifying the adjustment of the rotary heads for machining and polishing shafts of different diameters; said adjusting means comprising a pair of gear rings mounted on said support means turnable about the axis of said head and a plurality of pinions respectively connected to said first and second plurality of tool support means, the pinions being connected to said first plurality of tool support means meshing with one of the gear rings and the pinions connected to the second plurality of tool support means meshing with the other of said gear rings.

2. A head as defined in claim 1, and including a pair of manually operable means respectively cooperating with said first and said second gear ring for turning the two gear rings independent from each other about the axes thereof.

3. A head as defined in claim 2, wherein each of said manually operated means comprises an additional pinion turnably mounted on said support means and meshing with a respective one of the gear rings and a key fixed to the respective additional pinion and projecting outside of said support means.

4. A head as defined in claim 2, wherein each of said manually operated means comprises an additional pinion turnably mounted on said support means and meshing with a respective one of the gear rings and a key fixed to the respective additional pinion and projecting outside of said support means.

5. A head as defined in claim 4, wherein said gear rings and said pinions meshing therewith are bevel gears.

6. A head as defined in claim 5, wherein said tool support means of said first plurality alternate with the tool support means of said second plurality and wherein the axes of rotation of said pinion are arranged in a star-shaped manner about the axis of said head.

7. A head as defined in claim 4, wherein each inner end part is provided with a blind bore having an inner thread, said individually adjusting means includes an adjusting screw projecting into the blind bore and being provided with an outer thread meshing with the inner thread, and a scale connected to the adjusting screw and having a plurality of through holes engageable by a pin for providing turning of the adjusting screw and thereby obtaining an individual adjustment of the respective tool support means in radial direction to the shaft.

8. A head as defined in claim 4, wherein the outer part of each tool support means includes a screw spindle associated with a respective pinion of the plurality of pinions respectively connected to said first and second plurality of tool support means, said screw spindle cooperating with the inner end part in such a manner that upon actuation of the first or second adjusting means, the respective tool support means is simultaneously adjusted with all of said first or second tool support means.

* * * * *